Figure 1:
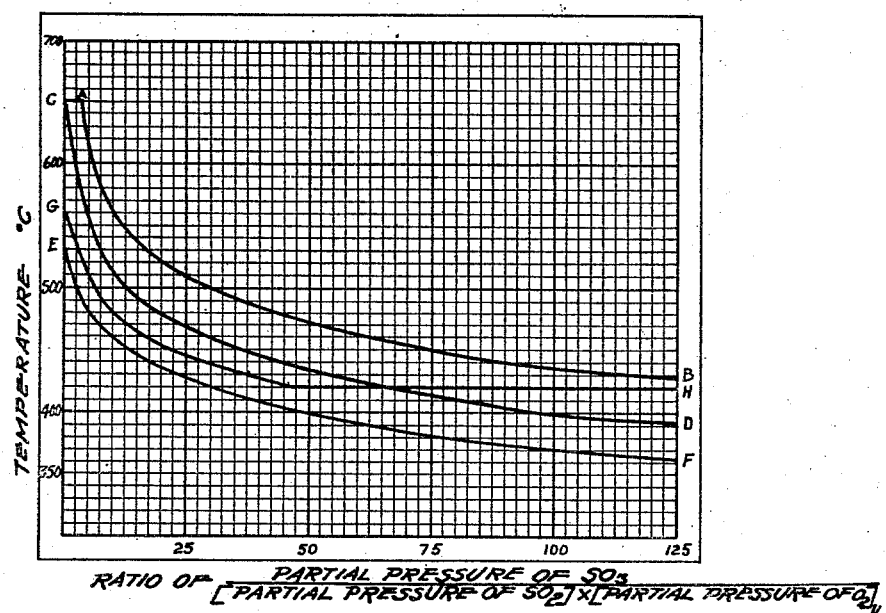

Nov. 8, 1938.  C. F. R. HARRISON ET AL  2,136,298
MANUFACTURE OF SULPHURIC ACID BY THE CONTACT PROCESS
Filed Feb. 29, 1936  2 Sheets-Sheet 1

INVENTORS
Charles F. R. Harrison
Arthur M. Clark
Charles L. Hilton
BY
ATTORNEY

Nov. 8, 1938.   C. F. R. HARRISON ET AL   2,136,298
MANUFACTURE OF SULPHURIC ACID BY THE CONTACT PROCESS
Filed Feb. 29, 1936   2 Sheets-Sheet 2

INVENTORS
Charles F.R.Harrison
Arthur M.Clark
Charles L.Hilton

BY

*G. Lutz* ATTORNEY

Patented Nov. 8, 1938

2,136,298

UNITED STATES PATENT OFFICE 2,136,298

MANUFACTURE OF SULPHURIC ACID BY THE CONTACT PROCESS

Charles Frederick Reed Harrison, Arthur Maurice Clark, and Charles Lacy Hilton, Norton-on-Tees, England, assignors to Imperial Chemical Industries Limited, a corporation of Great Britain Application February 29, 1936, Serial No. 66,496
In Great Britain February 28, 1935

5 Claims. (Cl. 23—175)

Our invention relates to the manufacture of sulphuric acid according to the contact process, and has for its object the carrying out of the reaction in a number of stages, not less than four, so controlled as to permit of the attainment of optimum conditions in each stage leading to an increase in the over-all efficiency of the manufacture.

In the contact process for the manufacture of sulphuric acid it is well known that as the temperature increases the rate of reaction greatly increases, so that an increased rate of conversion is obtained for a given mass of catalyst. On the other hand, the degree of conversion decreases as the temperature increases, since the equilibrium between sulphur dioxide, oxygen and sulphur trioxide ($2SO_2+O_2 \rightleftharpoons 2SO_3$) is less favourable.

It has, therefore, been customary hitherto to work at a temperature at which equilibrium considerations do not render substantially complete conversion impossible. Thus the catalyst has been operated under such conditions that it has not been utilized with the maximum efficiency.

Since the reaction $2SO_2+O_2 \rightleftharpoons 2SO_3$ is highly exothermic it is necessary in such processes to ensure that the heat liberated does not raise the temperature substantially. With this end in view it has been proposed to subject a mixture containing sulphur dioxide and free oxygen to a partial conversion into sulphur trioxide in a contact chamber, and then to pass the partially converted mixture into another contact chamber, after admixture with a gaseous cooling medium which contains a higher proportion of free oxygen than the mixture entering the first contact chamber.

With a view to obtaining a more efficient utilization of the catalyst, it has also been proposed to conduct the conversion in two stages. In the first stage the catalyst is operated at a higher temperature than that at which substantially complete conversion is possible, whereby an improved rate of conversion per unit mass of catalyst is obtained. The incompletely converted mixture is then passed over the catalyst in the second stage, which is maintained at a lower temperature such that the conversion is substantially completed.

Figure 2:
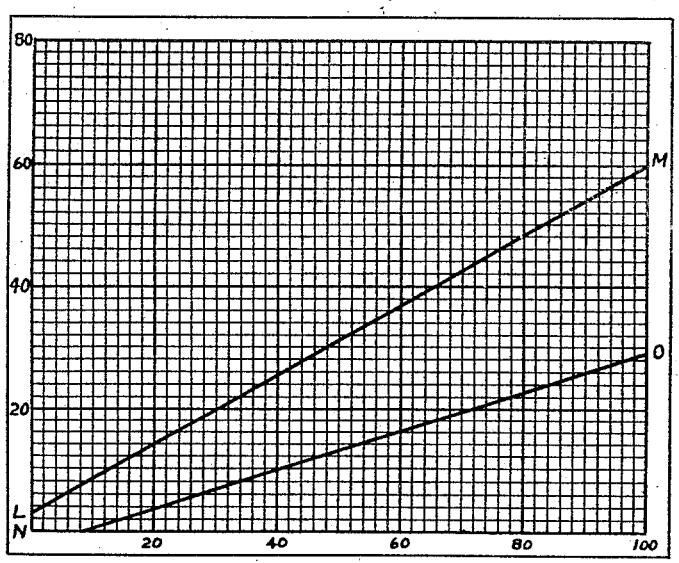
Figure 4:
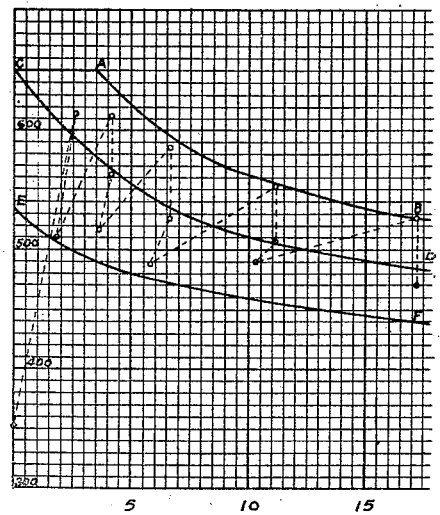
Figure 3:
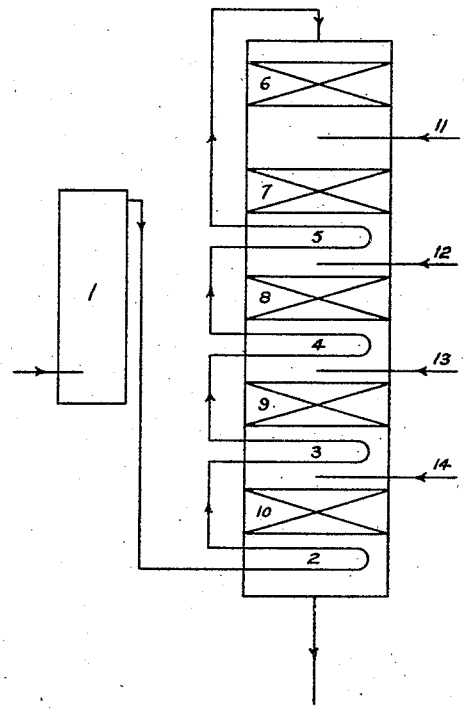

In the drawings, Fig. 1 is a series of curves which define maximum and minimum reaction temperatures; Fig. 2 is a set of curves which set forth maximum and minimum percentages of oxygen content carried by the gases; Fig. 3 is a diagrammatic sketch of one means of carrying out the method, with special reference to the specific example hereinafter set forth; and Fig. 4 is a graph defining the course of temperatures of the gases during the process of said specific example. These figures will be more fully defined as the description develops.

According to the present invention sulphur trioxide is obtained by passing a gaseous mixture containing sulphur dioxide and oxygen over a catalyst arranged in four or more stages, the percentage conversion of the initial $SO_2$ in the first stage not exceeding 50% and in each of the succeeding stages not exceeding 25%, the maximum temperature in each stage being maintained within the limits hereinafter defined with reference to Figure 1 of the accompanying drawings. The maximum temperature and the desired percentage conversion for the first stage may be obtained by suitably proportioning the amount of catalyst in it and by regulating the inlet temperature of the gaseous mixture, and for each subsequent stage by suitably proportioning the amount of catalyst in that stage, by adding an oxygen-containing gas substantially free from sulphur dioxide to the gaseous mixture before that stage and/or by extracting a portion of the sensible heat of the gaseous mixture by indirect heat exchange before its entry into that stage.

According to a particular form of the invention sulphur trioxide is obtained by passing a gaseous mixture containing sulphur dioxide and oxygen over a catalyst arranged in four or more stages, suitably proportioning the amount of catalyst in each stage, adding an oxygen-containing gas substantially free from sulphur dioxide to the gaseous mixture between the stages, and extracting a portion of the sensible heat of the gases leaving the second and subsequent stages by indirect heat exchange with the inlet gases to the first stage, so that the percentage conversion of the initial $SO_2$ in the first stage does not exceed 50% and in each subsequent stage does not exceed 25%, the maximum temperature in each stage being maintained within the limits hereinafter defined with reference to Figure 1 of the accompanying drawings. The percentage oxygen content of the gases throughout each stage is preferably regulated so that, calculated on a water-free basis, it is not less than $0.32x-2.65$ and not greater than $0.57x+2.96$, when $x$=the percentage ratio of the total oxygen added to the total oxygen plus total inert gases introduced to the process previous to the said stage. Outside these limits we have found that the rate of reaction is substantially lowered. The said limits are illustrated graphically in Figure 2 of the accompanying drawings, in which the ordinates represent the actual percentage concentration of oxygen in the gases (excluding water vapour) and the abscissae represent the percentage ratio of total oxygen added to the sum of the total oxygen and total inert gases (excluding water vapour) added. Thus, for example, when the initial gases passing to the first stage contain a ratio of inert gases to oxygen equal to that which obtains for air, and air is added between the stages, the concentration of oxygen throughout the process is preferably maintained between 4 and 14.5% calculated on a water-free basis. When an oxygen containing gas is added between the stages which has a different oxygen-inert gas ratio from that of the initial gases introduced to the first stage, the range of oxygen concentrations for any given stage is determined from the oxygen/oxygen plus inert gas ratio of the total gases introduced to the process previous to that stage.

The highest permissible maximum temperature of the gaseous mixture in each stage of the process depends on the relative proportions of the reactants, and is defined by the curve AB of Figure 1 of the accompanying drawings, in which the ordinates represent temperatures in degrees centigrade, and the abscissae represent the ratio $$\frac{\text{partial pressure of sulphur trioxide}}{\text{partial pressure of } SO_2 \text{ (partial pressure of oxygen)}^{\frac{1}{2}}}$$

partial pressure being measured in atmospheres.

The lowest permissible maximum temperature is defined by the curve CD. The maximum temperature in each stage must lie between the points on the curves AB, CD which correspond to the composition of the gaseous mixture.

The difference between the inlet temperature and the maximum temperature of each stage is determined by the amount of conversion which is to be effected in that stage. In order to limit the temperature rise in each stage, the amount of conversion performed in each stage has to be restricted. The proportion of the original sulphur dioxide converted in the first stage must not be more than 50% and is preferably not greater than 33%, and in each of the subsequent stages must not be more than 25%. So far as the rate of conversion alone is concerned, it is desirable to employ a large number of stages in each of which only a small amount of conversion is effected. The range of temperature in each stage may thereby be confined within narrower limits with a consequently greater mean rate of conversion. In practice, however, limitations as to the number of stages are set by the complexity of the apparatus thereby required.

The gases must enter the first stage at a temperature above that at which, with the catalyst used, the reaction is initiated, and the conversion in the first stage must be so arranged that the heat evolved by the reaction raises the temperature to a value between the curves AB and CD corresponding to the composition of the exit gases from the first stage.

When employing a platinum catalyst, it is desirable that the amount of conversion in the second and subsequent stages be chosen so that the inlet temperature to the stages is not below the curve EF (Figure 1). Similarly when a vanadium catalyst is employed, it is preferable for the inlet temperatures not to be below the curve GH (Figure 1).

The gases entering the first stage may be obtained in any known manner, but it is of particular advantage to employ a gaseous mixture of which at least 20% consists of sulphur dioxide, and of the remaining gases at least 21% consists of oxygen, calculated on a water-free basis.

A smaller volume of gases has thereby to be preheated, and the temperature of the gases rises more rapidly in the first stage to the range between the curves AB and CD of Figure 1.

It is advisable to obtain between 70% and 90% conversion of sulphur dioxide per passage through all of the stages, and preferably about 80%. Above 90% the rate of conversion is comparatively slow, while below 70% the rate of conversion is still considerable so that it is disadvantageous to terminate the conversion before at least 70% conversion is attained.

After removal of the sulphur trioxide from the exit gases of the last stage, the residual sulphur dioxide may be extracted or concentrated by any known method and passed again through the process with fresh gases. Thus for example, gases weak in sulphur dioxide such as ordinary burner gases may be introduced into the first stage together with concentrated sulphur dioxide which has been recovered from the gases leaving the final stage. The concentration or extraction of the sulphur dioxide in the exit gases may be conveniently carried out by absorption in and subsequent regeneration from suitable solvents, e. g. aqueous solutions of alkali hydroxides and/or alkali sulphites containing aluminium chloride, or aqueous solutions of salts of non-volatile weak acids such for example as citric acid or phosphoric acid, or aqueous solutions containing basic aluminium sulphate.

The sulphur trioxide produced may be condensed directly with steam to sulphuric acid. For this purpose the necessary water vapour may be introduced with the initial gases, or with the oxygen-containing gases introduced before one or more of the stages, or it may be added to the gases leaving the last stage.

One method of carrying out the present invention will now be described with reference to Figure 3 of the accompanying drawings, which illustrates diagrammatically a suitable form of apparatus. A platinum contact mass is used in this example, consisting of platinized silica gel containing 3.212 gm. of platinum per litre of catalyst. The weights of platinum in the five stages of the converter are as follows:—

| | Grams |
|---|---|
| 1 | 777.5 |
| 2 | 388.8 |
| 3 | 451.0 |
| 4 | 933.0 |
| 5 | 1244.0 |

A gaseous mixture containing 500 cu. m. of sulphur dioxide and 600 cu. m. of air is passed at the rate of 1100 cu. m./hr. upwardly through a tower 1 down which water at an inlet temperature of about 67° C. is allowed to fall, whereby 400 cu. m./hr. of water (measured at 20° C.) are taken up by the gases. The gases are then passed successively through the heat exchangers 2, 3, 4 and 5, in which their temperature is raised to 151° C., 214° C., 290° C. and 351° C. respectively. The hot gases then enter the first catalyst stage 6. 32% of the sulphur dioxide is converted in this stage and the gases leave at a temperature of 613° C. Air at atmospheric temperature at the rate of 400 cu. m./hr. is then added through pipe 11 to the gases, whereby their temperature is lowered to 510° C. They then enter the second catalyst stage 7, in which the percentage of sulphur dioxide converted is raised to 48%. The exit gases, which have a temperature of 612° C., are then passed through the heat exchanger 5, whereby their temperature falls to 561° C. They are then further cooled to 517° C. by the introduction through pipe 12 of air at atmospheric temperature at the rate of 200 cu. m./hr. The gases then pass through the third catalyst stage 8, in which the conversion of sulphur dioxide rises to 60%, and leave at a temperature of 585° C. They are then cooled to 527° C. by passage through the heat exchanger 4, then to 489° C. by the introduction through pipe 13 of cold air (20° C.) at the rate of 200 cu. m./hr. before entering the fourth catalyst stage 9. The conversion of sulphur dioxide is raised therein to 72% and the temperature to 552° C. The exit gases are cooled to 508° C. by the heat exchanger 3, and further to 490° C. by the introduction through pipe 14 of cold air (20° C.) at the rate of 100 cu. m./hr. The gases then pass through the final catalyst stage 10 in which the conversion of sulphur dioxide is carried to 80%. The exit gases are cooled from 527° C. to 470° C. by the heat exchanger 2, and are then treated for the condensation of sulphuric acid by passing them downwardly through a multi-tubular condenser (not shown) made of suitable corrosion-resisting material, e. g. stainless steel. The residual gases are then treated for the recovery of their sulphur dioxide, which is passed again through the converter with fresh gas.

The course of the temperatures of the gases during the process is shown by the dotted lines on Figure 4 of the accompanying drawings, in which the curves are portions of those shown in Figure 1 but on an enlarged abscissa scale. The oxygen concentration throughout the conversion is within the range of 4 and 14.5% of the total gases (excluding water vapour).

The loading according to this example is 8.424 kg. per day per gram of platinum.

The following are typical loadings for modern plants operated in accordance with known processes:

2.862 kg./day/gm. of platinum
1.125 kg./day/gm. of platinum
1.585 kg./day/gm. of platinum
1.993 kg./day/gm. of platinum
2.572 kg./day/gm. of platinum
5.08 kg./day/gm. of platinum
6.27 kg./day/gm. of platinum The figures in the above table refer to dry contact processes, i. e. processes in which the $SO_3$ is not condensed with steam. The figure of 8.424 kg. per day per gm. of platinum given for the catalyst loading in the example refers to a wet process, and an even higher figure would be expected if the reaction were carried out in the absence of water vapour.

Various modifications of the procedure previously described may be made in carrying out our invention, and all such modifications are intended to come within the scope of the appended claims insofar as they achieve to a useful degree the improvements and advantages hereinbefore disclosed.

We claim:

1. A process for the production of sulphur trioxide which comprises passing a gaseous mixture containing sulphur dioxide and oxygen over a catalyst arranged within at least four stages, the percentage conversion of the initial sulphur dioxide in the first stage not exceeding 50%, and in each of the succeeding stages not exceeding 25%, the total conversion ranging between approximately 70% and approximately 90%; maintaining the maximum temperature in each stage subsequent to the first stage within the limits defined by the curves A—B and C—D of the graph shown as Fig. 1 in the accompanying drawings, at the point on the abscissa of said graph corresponding to the value of the ratio of the gaseous mixture obtaining in the stage, said value being determined in accordance with the definition of the abscissa in said drawings; maintaining the inlet temperature in each stage after the first above the limit defined by curve E—F of said graph at the point on the abscissa corresponding to the gaseous mixture obtaining in the stage; and regulating the composition of the initial gaseous mixture so that it contains at least 20% of sulphur dioxide, and of the remaining gases at least 21% consists of oxygen, calculated on a water-free basis.

2. A process according to claim 1 wherein the catalyst is vanadium, and the inlet temperature in each stage after the first is maintained above the limit represented by the curve G—H of said graph at the point on the abscissa corresponding to the gaseous mixture obtaining in the stage.

3. A process according to claim 1 wherein air is added to the gaseous mixture between the stages.

4. A process according to claim 1 wherein the maximum temperature and the desired percentage conversion for the first stage are obtained by suitably proportioning the amount of catalyst in it; and for each subsequent stage by suitably proportioning the amount of catalyst in that stage and by adding an oxygen-containing gas substantially free from sulphur dioxide to the gaseous mixture entering that stage.

5. A process according to claim 1 wherein the percentage conversion in the first stage does not exceed 33%.

CHARLES F. R. HARRISON.
ARTHUR M. CLARK.
CHARLES LACY HILTON.

Certificate of Correction

Patent No. 2,136,298. November 8, 1938.

CHARLES FREDERICK REED HARRISON ET AL.

It is hereby certified that errors appear in the above numbered patent requiring correction as follows: In the drawings, sheet 1, at the bottom of Figure 1, for $$\text{RATIO OF} \frac{\text{PARTIAL PRESSURE OF SO}_3}{[\text{PARTIAL PRESSURE OF SO}_2] \times [\text{PARTIAL PRESSURE OF O}_2]}$$

read $$\text{RATIO OF} \frac{\text{PARTIAL PRESSURE OF SO}_3}{[\text{PARTIAL PRESSURE OF SO}_2] \times [\text{PARTIAL PRESSURE OF O}_2]^{\frac{1}{2}}};$$

page 2, of the printed specification, first column, lines 32 and 33, for $$\frac{\text{partial pressure of sulphur trioxide}}{\text{partial pressure of SO}_2 x \text{ (partial pressure of oxygen)}^{\frac{1}{2}}}$$

read $$\frac{\text{partial pressure of sulphur trioxide}}{\text{partial pressure of SO}_2 \times \text{(partial pressure of oxygen)}^{\frac{1}{2}}};$$

and second column, line 64, for the word "towel" read *tower;* and that the said Letters Patent should be read with these corrections therein that the same may conform to the record of the case in the Patent Office.

Signed and sealed this 10th day of January, A. D. 1939.

[SEAL]

Henry Van Arsdale

*Acting Commissioner of Patents.*